United States Patent
Allen et al.

(10) Patent No.: US 8,874,644 B2
(45) Date of Patent: Oct. 28, 2014

(54) METHOD, SYSTEM, CHAT INTERFACE, AND COMPUTER PROGRAM PRODUCT FOR COMPARING FREE TIME BETWEEN INSTANT MESSAGE CHAT MEMBERS

(75) Inventors: Timothy E. Allen, Durham, NC (US); Wilbert R. Joyner, Raleigh, NC (US); Jeremy G. Perry, Cary, NC (US); Eric Saari, Saratoga Springs, NY (US)

(73) Assignee: International Business Machines Corporation, Armonk, NY (US)

( * ) Notice: Subject to any disclaimer, the term of this patent is extended or adjusted under 35 U.S.C. 154(b) by 1381 days.

(21) Appl. No.: 10/726,457

(22) Filed: Dec. 3, 2003

(65) Prior Publication Data

US 2005/0125737 A1 Jun. 9, 2005

(51) Int. Cl.
*G06F 15/16* (2006.01)
*G06Q 10/06* (2012.01)
*G06Q 10/10* (2012.01)

(52) U.S. Cl.
CPC .......... *G06Q 10/109* (2013.01); *G06Q 10/0637* (2013.01)
USPC ............................. 709/204; 709/205; 709/206

(58) Field of Classification Search
USPC .......................................... 709/204, 206, 207
See application file for complete search history.

(56) References Cited

U.S. PATENT DOCUMENTS

| | | | | |
|---|---|---|---|---|
| 5,963,913 A * | 10/1999 | Henneuse et al. | ................ | 705/9 |
| 6,035,278 A * | 3/2000 | Mansour | ........................... | 705/9 |
| 6,101,480 A * | 8/2000 | Conmy et al. | .................... | 705/9 |
| 6,161,149 A * | 12/2000 | Achacoso et al. | ................ | 710/4 |
| 6,785,868 B1 * | 8/2004 | Raff | ................................ | 715/205 |
| 6,963,900 B2 * | 11/2005 | Boyd | ........................... | 709/204 |
| 7,007,235 B1 * | 2/2006 | Hussein et al. | ................ | 715/751 |
| 7,082,402 B2 * | 7/2006 | Conmy et al. | .................... | 705/8 |
| 7,149,810 B1 * | 12/2006 | Miller et al. | ................... | 709/246 |
| 7,159,008 B1 * | 1/2007 | Wies et al. | ..................... | 709/206 |
| 2002/0188620 A1 * | 12/2002 | Doss et al. | ................. | 707/104.1 |
| 2003/0041076 A1 * | 2/2003 | Lucovsky et al. | ............. | 707/500 |
| 2003/0095149 A1 * | 5/2003 | Fredriksson et al. | ......... | 345/797 |
| 2003/0131073 A1 * | 7/2003 | Lucovsky et al. | ............. | 709/219 |
| 2005/0065832 A1 * | 3/2005 | Virta | ................................ | 705/8 |

* cited by examiner

*Primary Examiner* — Umar Cheema
(74) *Attorney, Agent, or Firm* — Edward Choi; Hoffman Warnick LLC

(57) ABSTRACT

Under the present invention, a method, system, chat interface, and program product for comparing free time between instant message chat members in order to schedule an upcoming event are provided. The method includes: storing individual calendars corresponding to each member of the chat; initiating a free time comparison; and combining the individual calendars corresponding to each member of the chat into a free time summary calendar, wherein the free time summary calendar indicates at least one of free time periods that are simultaneously available to all of the members of the chat and conflict time periods during which at least two chat members simultaneously have an event scheduled. The free time summary calendar may be viewed in day, week, and month view formats.

12 Claims, 7 Drawing Sheets

US 8,874,644 B2

METHOD, SYSTEM, CHAT INTERFACE, AND COMPUTER PROGRAM PRODUCT FOR COMPARING FREE TIME BETWEEN INSTANT MESSAGE CHAT MEMBERS

BACKGROUND OF THE INVENTION

1. Field of the Invention

The present invention generally relates to instant messaging. More specifically, the present invention provides a method, system, chat interface, and computer program product for comparing free time between instant message (IM) chat members in order to schedule an upcoming event.

2. Background Art

As the use of computer technology continues to expand, computer users are increasingly communicating with each other in a network environment (e.g., over the Internet). One popular form of such communication is known as "chatting." In general, a chat is communication forum that allows users (i.e., "chat members") to exchange textual, graphical, video, and/or audio messages, or combinations thereof, as if they were communicating in person.

To date, several different types of forums exist whereby users can conduct chats over a network. Several examples include chat rooms and instant messaging (IM) services (e.g., Lotus Instant Messaging and Web Conferencing, MSN Messenger, AOL Instant Messenger (AIM), etc.), which allow users to communicate with each other on a one-on-one, one-on-many, or many-on-many basis.

Many IM services allow a user to maintain a "buddy list" containing a listing of other users frequently contacted via the IM service. Such a buddy list may also be used to provide activity/calendaring information to other users. For example, the buddy list may display user-provided activity/calendaring messages to other users (e.g., "I'm in a meeting," "I'll be back at my desk in 1 hour," "I'll be away on vacation from Jan. 1, 2004 to Jan. 15, 2014," etc.). While the activity/calendaring message function provided via a buddy list is somewhat helpful, it does not provide sufficient information to allow users participating in a chat to easily determine an acceptable mutual time to schedule an event involving the users, such as a face-to-face meeting, a teleconference an IM chat, etc.

In view of the foregoing, there exists a need for a method, system, chat interface, and program product for performing a free time search between users involved in a chat (e.g., by comparing user calendars), for allowing users involved in a chat to quickly and easily determine a suitable time for scheduling an upcoming event based on the results of the free time search, and for allowing the users to schedule the upcoming event directly from the chat interface.

SUMMARY OF THE INVENTION

In general, the present invention provides a method, system, chat interface, and program product for comparing free time between instant message chat members in order to schedule an upcoming event. In accordance with the present invention, users who are chatting using an IM chat service and who wish to schedule a future event can access a free time summary calendar that indicates the combined free time for the users in the chat for a given future time period (e.g., day, week, month, etc.). The free time summary calendar combines the individual calendars of the users in the chat, and indicates the free periods of time that are simultaneously available to all of the users during which a future event may be scheduled without a time conflict.

A first aspect of the present invention provides a method for comparing free time for members of a chat, comprising: storing individual calendars corresponding to each member of the chat; initiating a free time comparison; and combining the individual calendars corresponding to each member of the chat into a free time summary calendar, wherein the free time summary calendar indicates at least one of free time periods that are simultaneously available to all of the members of the chat and conflict time periods during which at least two chat members simultaneously have an event scheduled.

A second aspect of the present invention provides a system for comparing free time for members of a chat, comprising: a storage unit for storing individual calendars corresponding to each member of the chat; a system for initiating a free time comparison; a free time summary calendar system for combining the individual calendars corresponding to each member of the chat into a free time summary calendar, wherein the free time summary calendar indicates at least one of free time periods that are simultaneously available to all of the members of the chat and conflict time periods during which at least two chat members simultaneously have an event scheduled; and a display for displaying the free time summary calendar.

A third aspect of the present invention provides a chat interface for comparing free time for members of a chat, the interface comprising: a section for displaying contents of the chat; a section for entering data into the chat; a mechanism for initiating a free time comparison, wherein the free time comparison includes combining the individual calendars corresponding to each member of the chat into a free time summary calendar, wherein the free time summary calendar indicates at least one of free time periods that are simultaneously available to all of the members of the chat and conflict time periods during which at least two chat members simultaneously have an event scheduled; and a section for displaying the free time summary calendar A fourth aspect of the present invention provides a program product stored on a recordable medium for comparing free time for members of a chat, which when executed comprises: program code for storing individual calendars corresponding to each member of the chat; program code for initiating a free time comparison; and program code for combining the individual calendars corresponding to each member of the chat into a free time summary calendar, wherein the free time summary calendar indicates at least one of free time periods that are simultaneously available to all of the members of the chat and conflict time periods during which at least two chat members simultaneously have an event scheduled.

Therefore, the present invention provides a method, system, chat interface, and program product for comparing free time between instant message chat members in order to schedule an upcoming event.

BRIEF DESCRIPTION OF THE DRAWINGS

These and other features of this invention will be more readily understood from the following detailed description of the various aspects of the invention taken in conjunction with the accompanying drawings in which.

Figure 1:
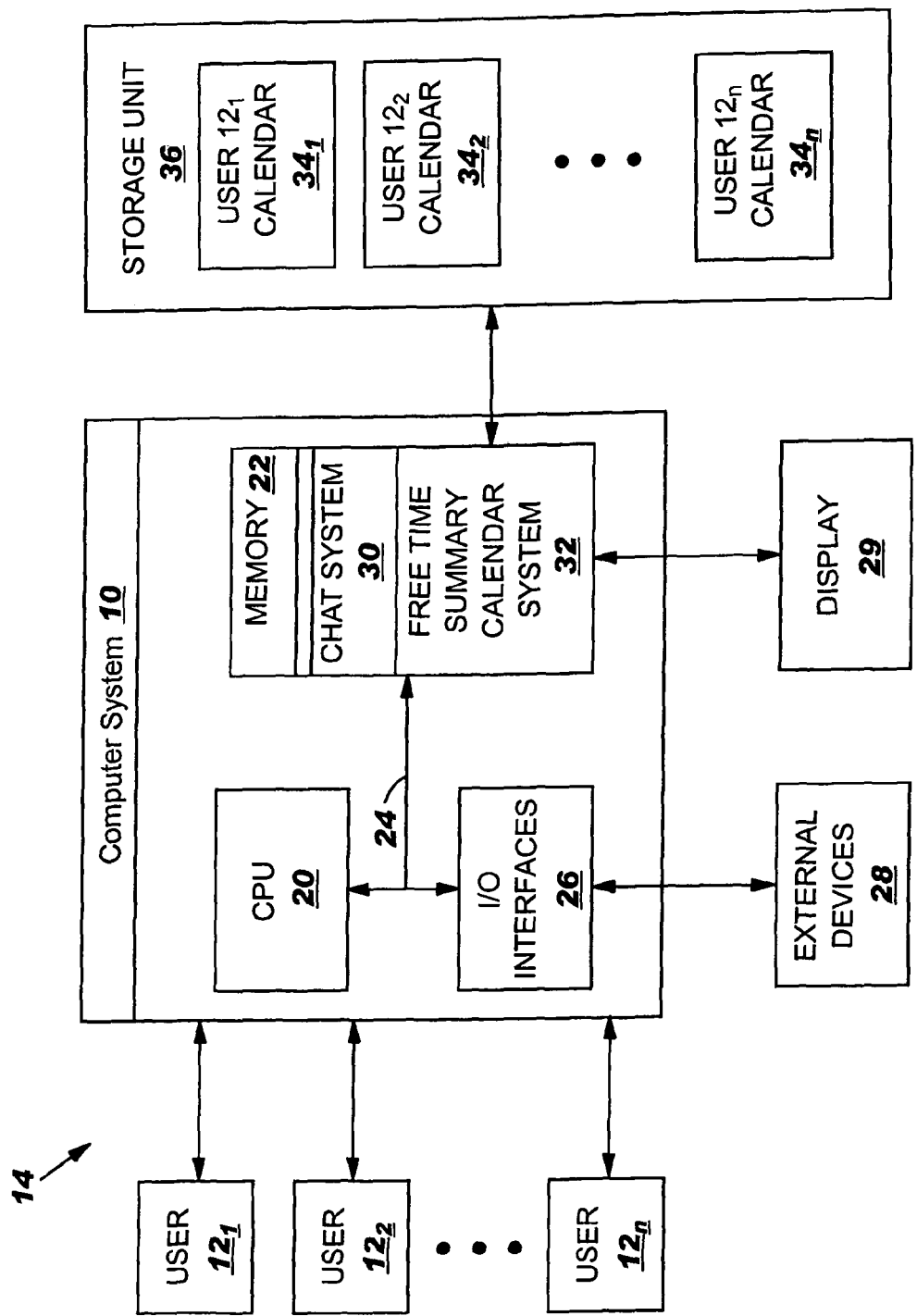
FIG. 1 depicts a computer system for allowing a plurality of users to chat with each other and to compare free time in order to schedule an upcoming event in accordance with the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, chat interface, and program product for comparing free time between instant message chat members in order to schedule an upcoming event. In accordance with the present invention, users who are chatting using an IM chat service and who wish to schedule a future event can access a free time summary calendar that indicates the combined free time for the users in the chat for a given future time period (e.g., day, week, month, etc.). The free time summary calendar combines the individual calendars of the users in the chat, and indicates the free periods of time that are simultaneously available to all of the users during which a future event may be scheduled without a time conflict. After establishing a free time period that is acceptable to all participants in the chat during which a future event can be scheduled, the future event may be scheduled by each user by accessing and updating their individual calendars.

Referring now to FIG. 1, a computer system 10 in accordance with the present invention for allowing a plurality of users 121, 122, . . . 12n to chat with each other and to compare free time in order to schedule an upcoming event is shown. It should be understood that the term "chat" as used herein is intended to refer to any type of network-based communication between computer users. Examples include, among others, chat room communications, instant messaging, cellular telephone text messaging, etc. In general, computer system 10 is intended to represent any type of computer system that is capable of supporting a chat among the plurality of users 121, 12, . . . 12n. For example, computer system 10 may comprise a laptop, personal computer, workstation, server, etc., or a handheld device, such as a personal digital assistant (PDA) cellular phone, pager, etc.

Each user 12, 122, . . . 12n employs a computer system (e.g., laptop, personal computer, workstation, server, PDA, cellular phone, pager, etc.) that is capable of communicating with computer system 10 over a network 14. Network 14 is intended to represent any type of network over which users 12, 122, . . . 12n can communicate with each other via computer system 10. For example, network 14 can include the Internet, a wide area network (WAN), a local area network (LAN), a virtual private network (VPN), or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, computer system 10 generally includes central processing unit (CPU) 20, memory 22, bus 24, input/output (I/O) interfaces 26 and external devices/resources 28. CPU 20 may comprise a single processing unit, or may be distributed across one or more processing units in one or more locations, e.g., on a client and server. Memory 22 may comprise any known type of data storage and/or transmission media, including magnetic media, optical media, random access memory (RAM), read-only memory (ROM), etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, handheld device, keyboard, mouse, voice recognition system, speech output system, printer, monitor/display, facsimile, pager, etc.

Bus 24 provides a communication link between each of the components in computer system 10 and likewise may comprise any known type of transmission link, including electrical, optical, wireless, etc. In addition, although not shown, additional components, such as cache memory, communication systems, system software, etc., may be incorporated into computer system 10. It should be understood that the computer systems used by a plurality of users 12, 122, . . . 12n typically include components (e.g., CPU, memory, etc.) similar to those described with regard to computer system 10.

Shown in memory 22 is chat system 30, which can be any program that provides chat capabilities. For example, chat system 30 could be a program similar to Lotus Instant Messaging and Web Conferencing, MSN Messenger, or AOL Instant Messenger (AIM)). Also shown in memory 22 is a free time summary calendar system 32 that is configured to indicate the combined free time for each of the users 12, 122, . . . 12n participating in a chat for a given future time period (e.g., day, week, month, etc.). The free time summary calendar system 32 combines the individual calendars 341, 342, . . . 34n of each of the users 12, 122, . . . 12n participating in the chat, and indicates the free periods of time that are simultaneously available to all of the users 12, 122, . . . 12n participating in the chat during which a future event may be scheduled without a time conflict. In the present invention, an event is intended to represent any type of activity that can be scheduled in a calendaring system, including, for example, a meeting, a telephone call, a vacation day, an appointment with a doctor, a "to do" activity, etc. The individual calendars 341, 342, . . . 34n of each of user 12, 122, . . . 12n, respectively, are stored in a storage unit 36. Storage unit 36 can be any system capable of providing storage for information, such as calendars 341, 342, . . . 34n, under the present invention. As such, storage unit 36 may reside at a single physical location, comprising one or more types of data storage, or may be distributed across a plurality of physical systems in various forms. In another embodiment, storage unit 36 may be distributed across, for example, a local area network (LAN), wide area network (WAN) or a storage area network (SAN) (not shown).

The operation of the free time summary calendar system 32 of the present invention is illustrated in FIGS. 2-6.

Figure 2:
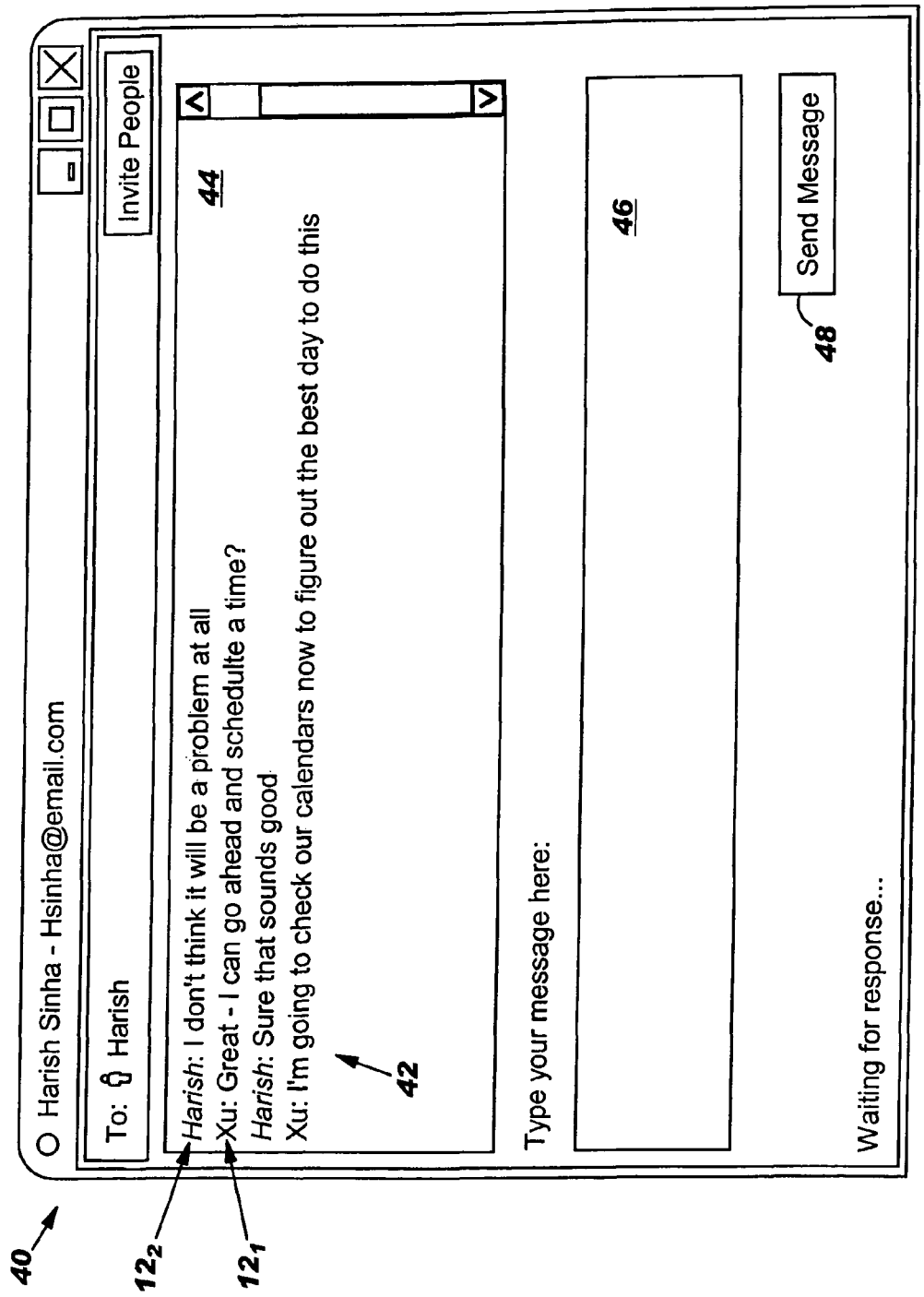
FIG. 2 depicts an exemplary chat interface in accordance with the present invention.

An exemplary chat interface 40 in accordance with a present invention is shown in FIG. 2. As depicted, a chat 42 is being held between a first user 12, "Xu Smith" and a second user 12₁ "Harish Sinha" via chat system 30 (FIG. 1). The chat interface 40 comprises a chat area 44 in which a dialog between the first and second users 12₁, 12₂ is displayed, a compose message area 46 in which the first user 12₁ "Xu Smith" types a message, and a "send message" button 48 for inserting the message typed in the compose message area 46 into the chat 42. The second user 12₂ "Harish Sinha" participates in the chat 42 using a similar chat interface 40. It should be noted that the chat interface 40 is intended to be illustrative only, and that many other chat interface implementations could be provided without departing from the scope of the present invention as set forth in the claims.

Figure 3:
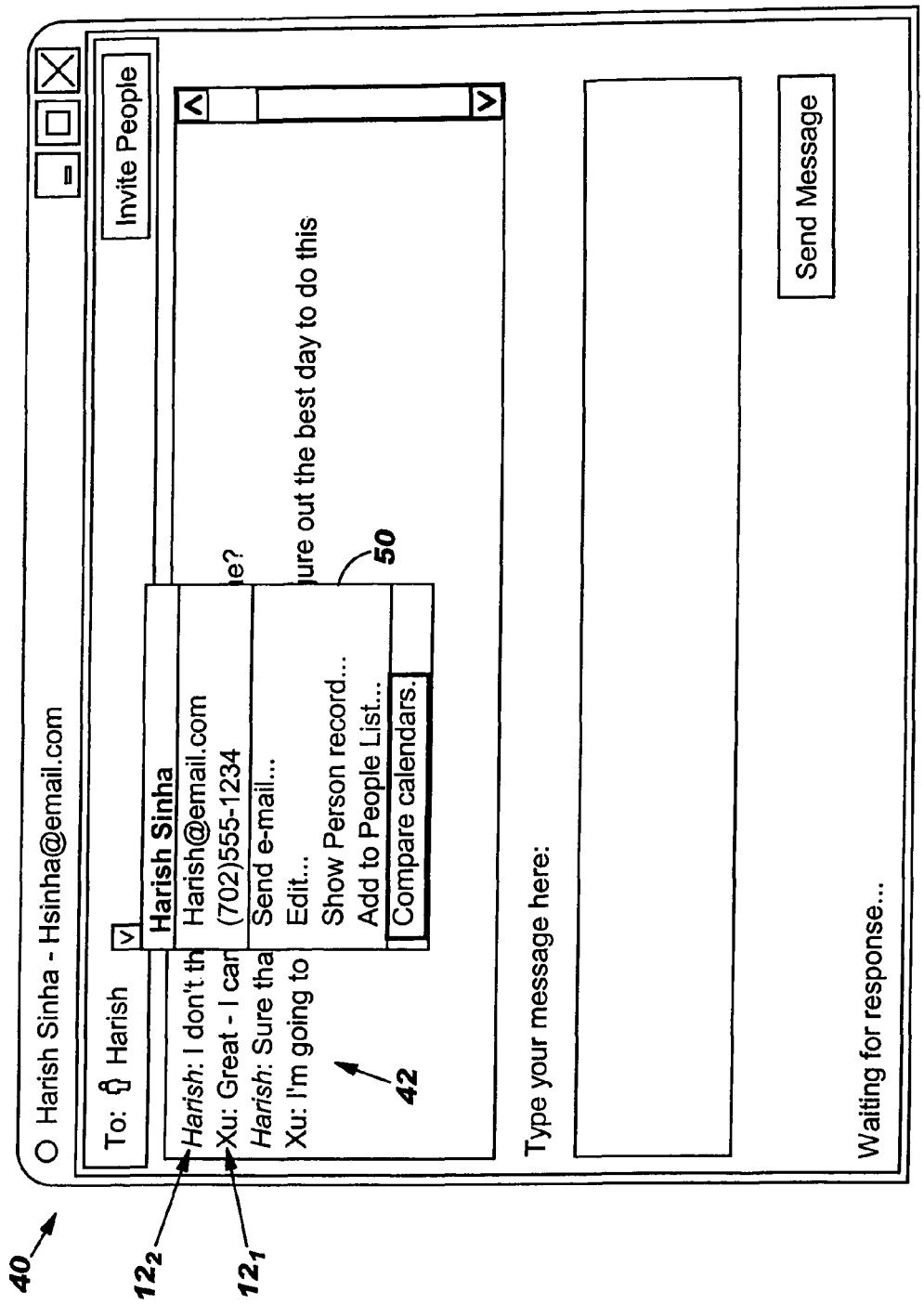
FIG. 3 depicts the initialization of the free time summary calendar system of the present invention via the chat interface of FIG. 2.
Figure 5:
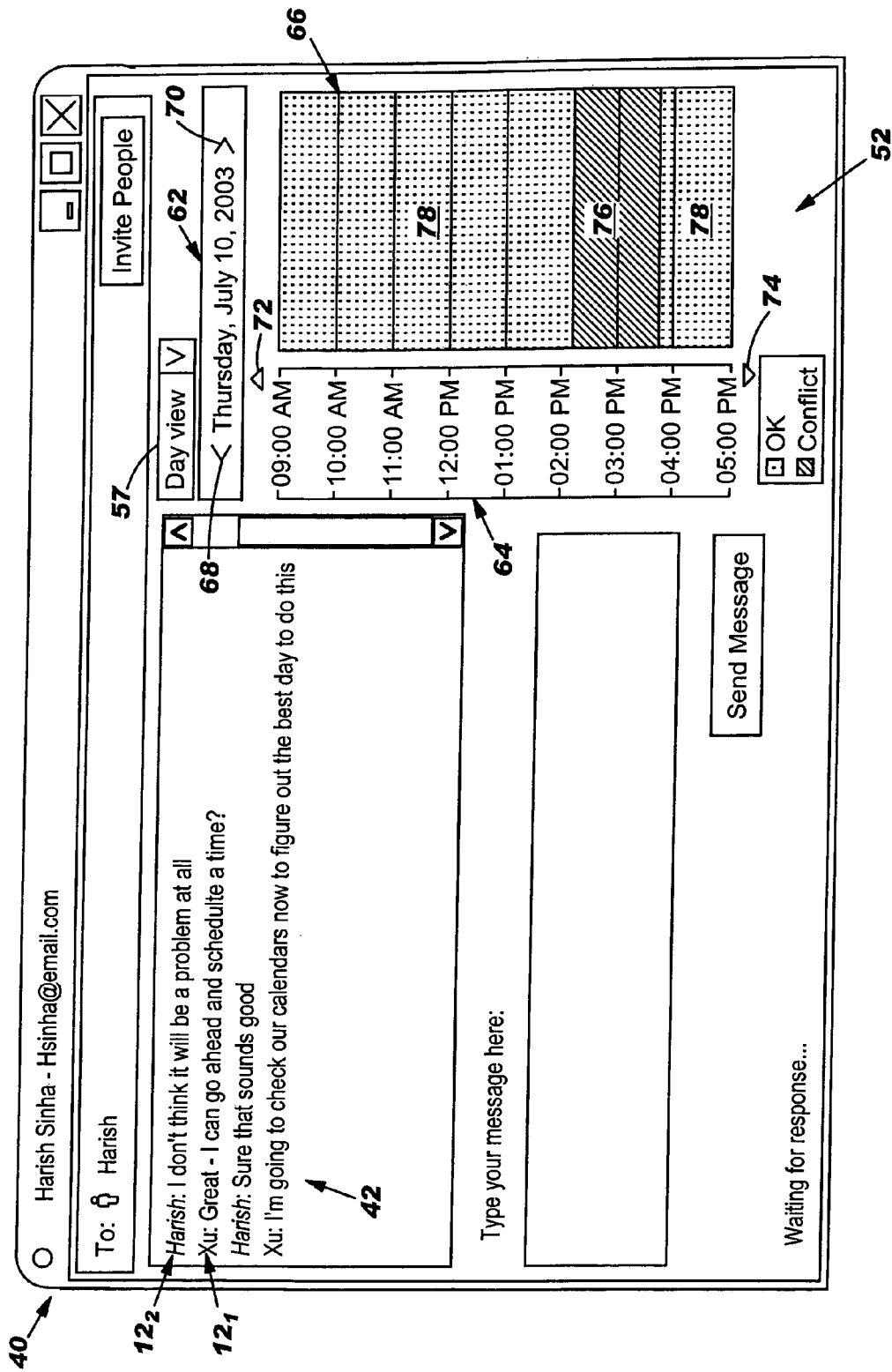
FIG. 5 depicts the chat interface of FIG. 2 with the results of the free time comparison displayed in a day view format.
Figure 6:
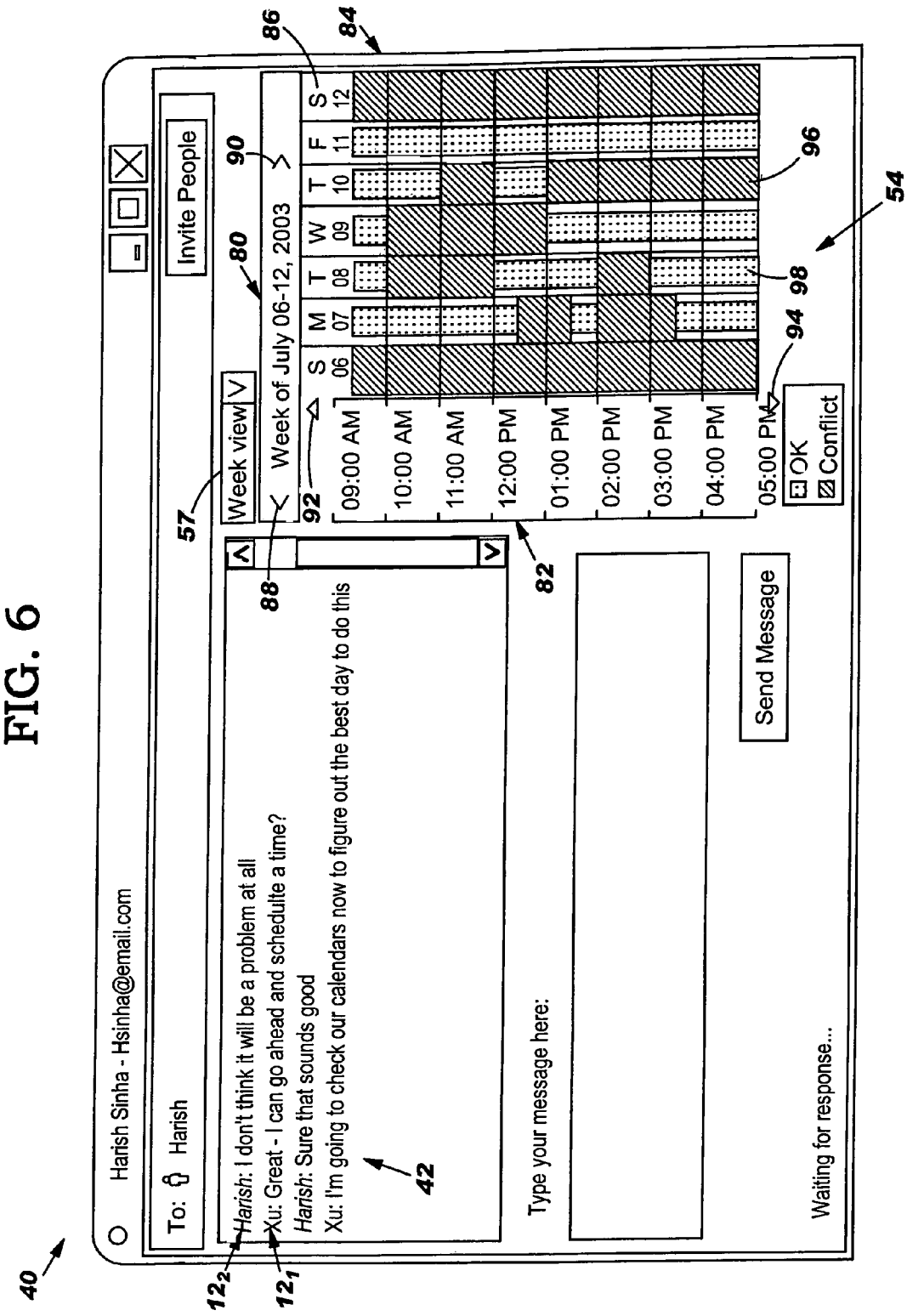
FIG. 6 depicts the chat interface of FIG. 2 with the results of the free time comparison displayed in a week view format.
Figure 7:
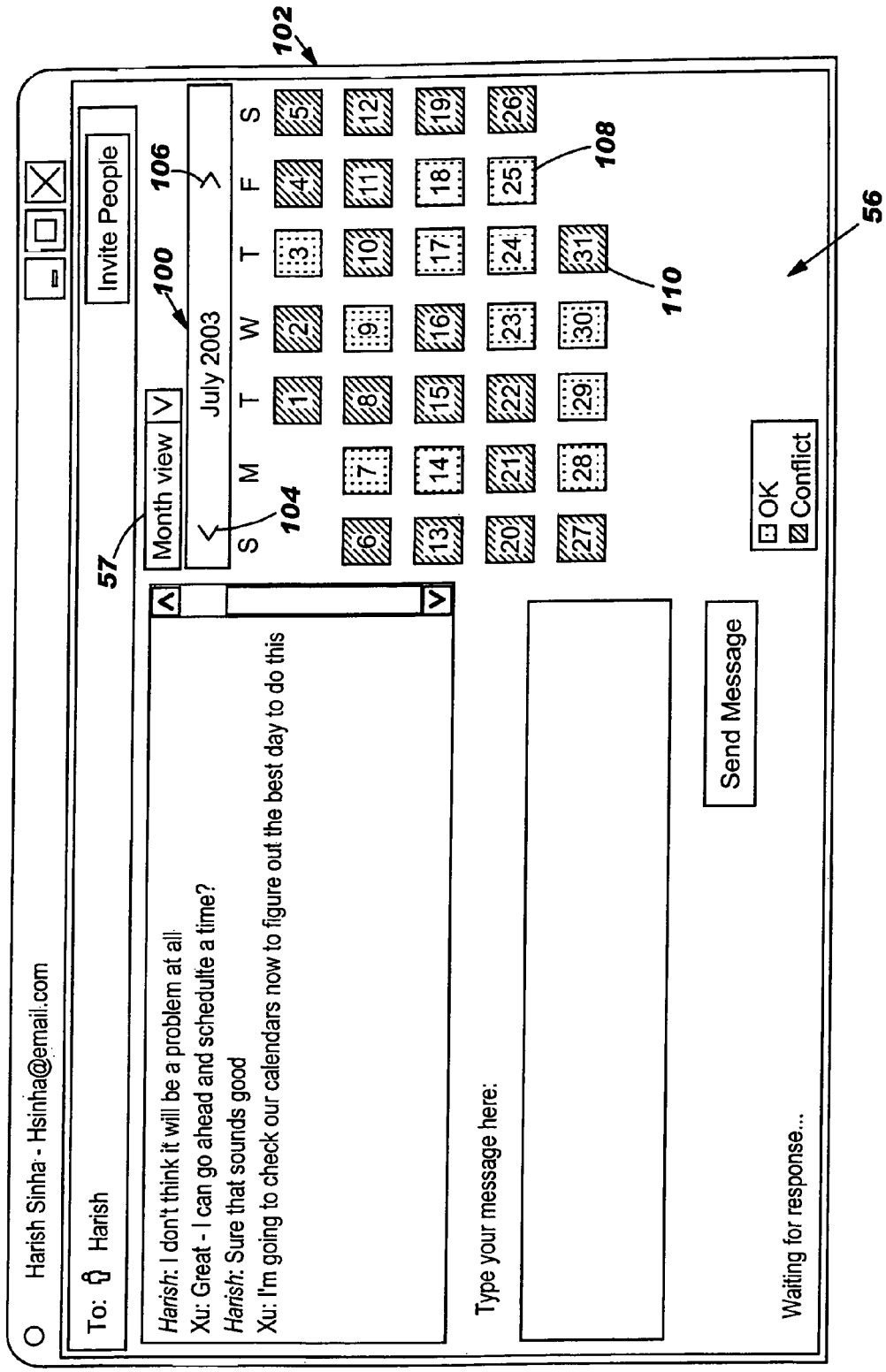
FIG. 7 depicts the chat interface of FIG. 2 with the results of the free time comparison displayed in a month view format.

As shown in the chat area 44, the chat 42 has progressed to a point where the first user 12₁ "Xu Smith" and the second user 12₂ "Harish Sinha" have decided to schedule a time for a meeting using the free time summary calendar system 32 (FIG. 1) of the present invention. In this example, the free time summary calendar system 32 is initiated by the first user 12₁ "Xu Smith." Specifically, as depicted in FIG. 3, the first user 12₁ "Xu Smith" initiates the free time summary calendar system 32 by accessing and clicking on a "compare calendars" menu item via a pop-down window 50. Other known techniques, such as a mouse-activated button, selection via a "File" or "Options" menu, etc., may also be used to initiate the free time summary calendar system 32 of the present invention. The free time summary calendar system 32 accesses the individual calendars 34₁, 34₂ associated with each of the users in the chat 42 (i.e., first user 12₁ "Xu Smith" and second user 12₂ "Harish Sinha") from the storage unit 36 (FIG. 1), compares the calendars 34₁, 34₂ to determine free periods of time that are simultaneously available to users 12₁, 12₂ during which a future event may be scheduled without a time conflict, and displays on display 29 (FIG. 1) the results of the free time comparison to at least the initiating user 12₁. The results of the free time comparison can be displayed, for example, in a day view format 52, week view format 54, and month view format 56, as shown in FIGS. 5-7, respectively. The results may be displayed as part of the chat interface 40 of the initiating user (i.e., first user 12₁ "Xu Smith"), or as part of the chat interfaces 40 of all of the users 12₁, 12₂ participating in the chat 42.

Figure 4:
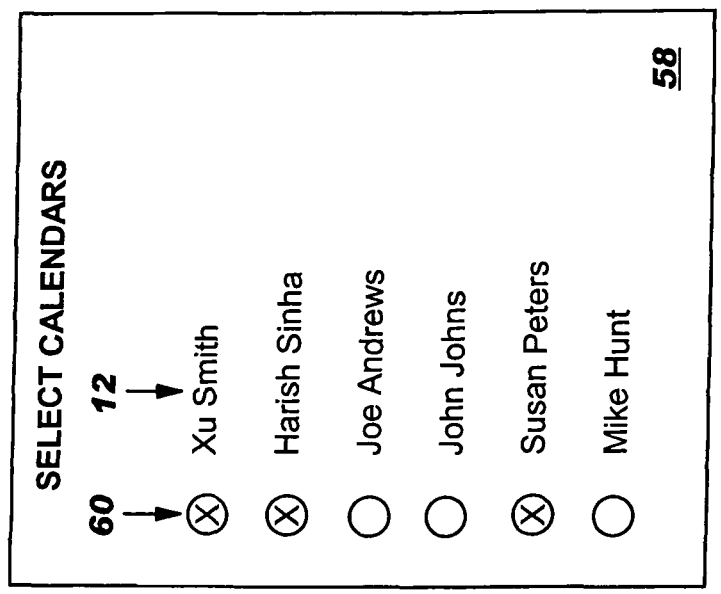
FIG. 4 depicts an exemplary selection box for selecting the calendars of specific users for free time comparison.

By default, the free time summary calendar system 32 accesses only the individual calendars 34₁, 34₂ associated with each of the users participating in the chat 42 (i.e., first user 12₁ "Xu Smith" and second user 12₂ "Harish Sinha," in FIG. 3). However, as shown in FIG. 4, the "compare calendars" menu item, when activated, may be configured to bring up a selection box 58 from which the calendars of selected users, who may or may not be participating in the chat 42, can be incorporated into the free time comparison of the present invention. For example, as depicted in FIG. 4, the selection box 58 may include radio buttons 60 or other types of selection mechanisms for allowing a user to select which user calendars 34 to include in the free time comparison. In this example, the radio buttons 60 corresponding to first user 12₁ "Xu Smith" and second user 12₂ "Harish Sinha" are selected (indicated by an "X") by default, while the calendar corresponding to "Susan Peters," who is not participating in the chat 42, has also been selected. To this extent, the individual calendars of "Xu Smith," "Harish Sinha," and "Susan Peters" will be compared to determine free periods of time that are simultaneously available to these users.

Referring again to FIG. 3, when the "compare calendars" menu item is selected via the pop-down window 50, the initiating user (i.e., first user 12₁ "Xu Smith" in this case) can select among various free time comparison views, including a day view format 52 (FIG. 5), a week view format 54 (FIG. 6), and a month view format 56 (FIG. 7). Upon selection of one of these view formats (e.g., via drop-down selection menu 57 or other type of selection mechanism), the free periods of time that are simultaneously available to all of the users 12₁, 12₂, . . . 12n participating in the chat are displayed. This information may be displayed as shown in FIGS. 5-7 by enlarging the size of the chat interface 40. However, any other suitable display mechanism, such as a fly-out window, pop-up window, etc., may also be used to display this information.

The day view format 52 illustrated in FIG. 5 displays a date 62 (e.g., "Thursday, Jul. 10, 2003"), a time span 64 (e.g., 09:00 AM to 05:00 PM), and a free time display area 66. Different dates 62 can be displayed by clicking on navigation arrows 68 and 70. For example, by clicking on navigation arrow 68, the displayed date 62 moves backwards in time (e.g., to "Wednesday Jul. 9, 2003"), while by clicking on navigation arrow 70, the displayed date 62 moves forward in time (e.g., to "Friday Jul. 11, 2003"). Different time spans 64 (8-hours in this example) can be displayed (e.g., in 1 hour increments) by clicking on up and down arrows 72 and 74, respectively.

The free time display area 66 displays the conflict time periods 76 during which two or more of the users 12₁, 12₂, . . . 12n simultaneously have an event scheduled in their respective calendars 34₁, 34₂, . . . 34n and free time periods 78 during which all of the users participating in the chat 12₁, 12₂, . . . 12n simultaneously have free time in their respective calendars 34₁, 34₂, . . . 34n. Thus, as shown in FIG. 5, for example, all of the users 12₁, 12₂, . . . 12n simultaneously have free time between 09:00 AM and 02:15 PM and from 03:45 PM to 05:00 PM on Thursday, Jul. 10, 2003, while at least two of the users 12₁, 12₂, . . . 12n simultaneously have an event scheduled from 02:15 PM to 03:45 PM on that day.

In FIGS. 5-7, the conflict time periods 76 and free time periods 78 are displayed using different colors to allow a user to easily distinguish between the different time periods 76, 78. It should be noted, however, than any other suitable type of mechanism for allowing a user to distinguish between conflict and free time periods 76, 78 may also be used in the practice of the present invention. For example, a free time period 78 may be labeled as "F" or "Free," while a conflict time period 76 may be labeled as "C" or "Conflict." Further, only the free time periods 78 may be displayed, and all other time periods will inherently correspond to conflict time periods 76 (i.e., the conflict time periods 76 do not have to be explicitly displayed). Likewise, only the conflict time periods 76 may be displayed, and all other time periods will inherently correspond to free time periods 78 (i.e., the free time periods 78 do not have to be explicitly displayed).

The week view format 54 illustrated in FIG. 6 displays a week's worth of time 80 (e.g., "Week of Jul. 6-12, 2003"), a time span 82 (e.g., 09:00 AM to 05:00 PM), and a free time display area 84 which displays free time information for each day 86 in the week 80. Different weeks 80 can be displayed by clicking on navigation arrows 88 and 90. For example, by clicking on navigation arrow 88, the displayed week 80 moves backwards in time (e.g., to "Week of Jun. 29-Jul. 5, 2003"), while by clicking on navigation arrow 90, the displayed week 80 moves forward in time (e.g., to "Week of Jul. 13-19, 2003"). Different time spans 82 (8-hours in this example) can be displayed (e.g., in 1 hour increments) by clicking on up and down arrows 92 and 94, respectively.

The free time display area 84 displays free time information similar to that provided in the day view format 52 shown in FIG. 5, but on a weekly basis. Specifically, the free time display area 84 displays, for each day 86 in the week 80, the free time periods 98 during which all of the users participating in the chat 121, 122, ... 12n simultaneously have free time in their respective calendars 341, 342, ... 34n, and conflict time periods 96 during which two or more of the users 121, 122, ... 12n simultaneously have an event scheduled in their respective calendars 341, 342, ... 34n. Thus, as shown in FIG. 6, for example, all of the users 121, 122, ... 12n simultaneously have free time from 09:00 AM to 05:00 PM on Friday, Jul. 11, 2003, while at least two of the users 121, 122, ... 12n simultaneously have a conflict between 09:00 PM and 05:00 PM on Sun, Jul. 6, 2003.

The month view format 56 illustrated in FIG. 7 displays a month 100 (e.g., "July 2003") and a free time display area 102. Different months 100 can be displayed by clicking on navigation arrows 104 and 106. For example, by clicking on navigation arrow 104, the displayed month 100 moves backwards in time (e.g., to "June 2003), while by clicking on navigation arrow 106, the displayed month 100 moves forward in time (e.g., to "August 2003").

The free time display area 102 displays free days 108 during the month 100 in which there is at least one free time period during which all of the users participating in the chat 121, 122, ... 12n simultaneously have free time in their respective calendars 341, 342, ... 34n, and conflict days 110 in which there are no free time periods during which all of the users participating in the chat 121, 122, ... 12n simultaneously have free time in their respective calendars 341, 342, ... 34n. Thus, as shown in FIG. 7, for example, all of the users participating in the chat 121, 122, ... 12n simultaneously have free time in their respective calendars 341, 342, ... 34n on Jul. 25, 2003, while on Jul. 31, 2003, there are no free time periods during which all of the users participating in the chat 121, 122, ... 12n simultaneously have free time in their respective calendars 341, 342, ... 34n. Once a free day 108 is chosen for the possible scheduling of a future event, the week or day view format 54, 52 can be accessed via menu 57 to specifically determine the free time periods that free day during which a future event can be scheduled.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for comparing free time for members of an instant message (IM) chat within an IM chat interface, the method comprising:
    storing individual calendars corresponding to each member of the IM chat and at least one person who is not a member of the IM chat;
    initiating a free time comparison in response to an actuation of a selection mechanism via the IM chat interface, the IM chat interface comprising an IM chat area for displaying a dialog between the members of the IM chat,
    wherein initiating a free time comparison further comprises displaying a selection window including a plurality of selection mechanisms corresponding to each member of the IM chat and the at least one person who is not a member of the IM chat,
    wherein the selection mechanisms corresponding to each member of the IM chat are selected automatically by default, and
    wherein the selection mechanisms corresponding to each of the at least one person who is not a member of the IM chat are not selected by default, but can be manually selected to be included in the free time comparison;
    combining the individual calendars corresponding to each member of the IM chat and the at least one person who is not a member of the IM chat into a free time summary calendar,
    wherein the free time summary calendar indicates at least one of free time periods that are simultaneously available to all of the members of the IM chat and the at least one person who is not a member of the IM chat and conflict time periods during which at least two IM chat members simultaneously have an event scheduled; and
    enlarging the IM chat interface and displaying the free time summary calendar adjacent to the chat area of the IM chat interface,
    wherein the free time summary calendar indicates free time periods and conflict time periods in a format selected from the group consisting of: a day view format, a week view format, and month view format.

2. The method of claim 1, wherein the day view format and the week view format indicate free time periods and conflict time periods during a predetermined time span.

3. The method of claim 1, wherein the day view format and the week view format indicate free time periods that are simultaneously available to all of the members of the IM chat.

4. The method of claim 1, wherein the month view indicates free days during which there is at least one simultaneously available free time period for all of the members of the IM chat, and conflict days during which there are no simultaneously available free time periods for all of the members of the IM chat.

5. The method of claim 1, further comprising:
    switching between the day view format, week view format, and month view format.

6. A system comprising:
    at least one computer system configured to compare free time for members of an instant message (IM) chat within an IM chat interface by performing actions including:
        storing individual calendars corresponding to each member of the IM chat and at least one person who is not a member of the IM chat;
        initiating a free time comparison in response to an actuation of a selection mechanism via the IM chat interface, the IM chat interface comprising an IM chat area for displaying a dialog between the members of the IM chat, wherein initiating a free time comparison further comprises displaying a selection window including a plurality of selection mechanisms corresponding to each member of the IM chat and the at least one person who is not a member of the IM chat, wherein the selection mechanisms corresponding to each member of the IM chat are selected automatically by default, and wherein the selection mechanisms corresponding to each of the at least one person who is not a member of the IM chat are not selected by default, but can be manually selected to be included in the free time comparison;

combining the individual calendars corresponding to each member of the IM chat and the at least one person who is not a member of the IM chat into a free time summary calendar, wherein the free time summary calendar indicates at least one of free time periods that are simultaneously available to all of the members of the IM chat and the at least one person who is not a member of the IM chat and conflict time periods during which at least two IM chat members simultaneously have an event scheduled; and enlarging the IM chat interface and displaying the free time summary calendar adjacent to the chat area of the IM chat interface, wherein the free time summary calendar indicates free time periods and conflict time periods in a format selected from the group consisting of: a day view format, a week view format, and a month view format.

7. The system of claim 6, wherein the day view format and the week view format indicate free time periods and conflict time periods during a predetermined time span.

8. The system of claim 6, wherein the day view format and the week view format indicate free time periods that are simultaneously available to all of the members of the IM chat.

9. The system of claim 6, wherein the month view indicates free days during which there is at least one simultaneously available free time period for all of the members of the IM chat, and conflict days during which there are no simultaneously available free time periods for all of the members of the IM chat.

10. The system of claim 6, wherein the computer system is further configured to perform:

switching between the day view format, week view format, and month view format.

11. The method of claim 1, further comprising:

navigating between individual days within said day view format, week view format, and month view format.

12. The system of claim 6, wherein the at least one computer system is further configured to perform actions including:

navigating between individual days within said day view format, week view format, and month view format.

\* \* \* \* \*